(12) United States Patent
Li (10) Patent No.: US 10,931,475 B1
(45) Date of Patent: Feb. 23, 2021

(54) DATA TRANSMISSION OVER WIRED NETWORKS

(71) Applicant: Beijing Segrun Intelligence Technology Co., Ltd., Beijing (CN)

(72) Inventor: Guanjun Li, Beijing (CN)

(73) Assignee: BEIJING SEGRUN INTELLIGENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/729,866

(22) Filed: Dec. 30, 2019

(30) Foreign Application Priority Data

Dec. 26, 2019 (CN) .......................... 201911371786.7

(51) Int. Cl.
| | |
|---|---|
| *H04L 25/00* | (2006.01) |
| *H04B 1/08* | (2006.01) |
| *H04L 12/40* | (2006.01) |
| *G06F 13/42* | (2006.01) |
| *H04L 1/00* | (2006.01) |
| *H04B 1/38* | (2015.01) |

(52) U.S. Cl.
CPC .......... *H04L 12/40* (2013.01); *G06F 13/4286* (2013.01); *H04B 1/38* (2013.01); *H04L 1/004* (2013.01); *G06F 2213/0002* (2013.01)

(58) Field of Classification Search
CPC ..... H04L 12/40; H04L 1/004; G06F 13/4286; H04B 1/38
USPC .......................... 375/219, 295, 224, 228, 256
See application file for complete search history.

(56) References Cited

U.S. PATENT DOCUMENTS

| | | | | |
|---|---|---|---|---|
| 5,635,911 | A * | 6/1997 | Landers ................ | G06M 1/101 111/903 |
| 5,642,350 | A * | 6/1997 | Dailey ................ | G06F 13/4286 370/439 |
| 9,337,993 | B1 * | 5/2016 | Lugthart ............... | H04L 7/0054 |
| 2004/0199701 | A1 * | 10/2004 | Eckmuller .......... | H04L 25/0272 710/305 |
| 2012/0327978 | A1 * | 12/2012 | Nishimura ........ | H04L 12/40032 375/211 |
| 2014/0376599 | A1 * | 12/2014 | Xi ....................... | H04L 12/4135 375/211 |
| 2016/0344552 | A1 * | 11/2016 | Sharma ................... | G06F 21/85 |
| 2017/0235698 | A1 * | 8/2017 | van der Maas ......... | H04L 63/14 710/106 |
| 2017/0344508 | A1 * | 11/2017 | Setiawan ............ | G06F 13/4282 |
| 2019/0334970 | A1 * | 10/2019 | Pandey ................ | H04L 65/607 |

* cited by examiner

*Primary Examiner* — Tesfaldet Bocure
(74) *Attorney, Agent, or Firm* — Getech Law LLC; Jun Ye (57) ABSTRACT

Aspects for data transmission over wired networks are described herein. The aspects may include a first transceiver and a second transceiver respectively connected to a communication bus. When the first transceiver receives differential signals from the communication bus, the first transceiver may be configured to convert the differential signals to digital signals and further to transmit the digital signals to a configurable logic circuit connected to both the first transceiver and the second transceiver. The configurable logic circuit may be configured to transmit the digital signals to the second transceiver when the communication bus is idle. The second transceiver may be configured to convert the digital signals back to differential signals and transmit the differential signals back to the communication bus.

16 Claims, 5 Drawing Sheets

DATA TRANSMISSION OVER WIRED NETWORKS

BACKGROUND

Wired networks including communication interface chips may be implemented for large scale industrial control among nodes in different locations. Conventionally, communication interface chips, such as those in RS-485/RS-422/RS-232 transceivers, may be connected to a communication bus and may be configured to transceiver data to and from the communication bus.

However, the conventional technology may include several disadvantages. For example, a RS-485 transceiver may only drive up to 32 nodes, which creates difficulties in establishing large scale networks. Further, the distance between two adjacent nodes may not exceed 1200 meters causing troubles in long distance communications. Further still, a conventional RS-485 may be configured to work in half-duplex or full-duplex mode and thus cannot be configured to perform functions including carrier-sense multiple access/conflict detection (CSMA/CD). In such conventional networks, one misfunctioning device may paralyze the entire network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example data transmission system. The example data transmission system may include a first transceiver connected to a communication bus and configured to receive first differential signals from the communication bus and convert the first differential signals to digital signals. The example data transmission system may further include a configurable logic circuit communicatively connected to the first transceiver and configured to receive the digital signals from the first transceiver and transmit the digital signals to a microcontroller unit (MCU). The MCU may be configured to determine whether the digital signals carry information for a device associated with the MCU and instruct, based on a determination that the digital signals do not carry information for the device associated with the MCU, the configurable logic circuit to transmit the digital signals to a second transceiver connected to the communication bus. The second transceiver may be configured to convert the digital signals to second differential signals and transmit the second differential signals to the communication bus.

The example aspect may further include an example method for data transmission over wired networks. The example method may include receiving, by a first transceiver connected to a communication bus, first differential signals from the communication bus; converting, by the first transceiver, the first differential signals to digital signals; receiving, by a configurable logic circuit communicatively connected to the first transceiver, the digital signals from the first transceiver; transmitting, by the configurable logic circuit, the digital signals to a microcontroller unit (MCU); determining, by the MCU, whether the digital signals carry information for a device associated with the MCU; instructing, by the MCU based on a determination that the digital signals do not carry information for the device associated with the MCU, the configurable logic circuit to transmit the digital signals to a second transceiver connected to the communication bus; converting, by the second transceiver, the digital signals to second differential signals; and transmitting, by the second transceiver, the second differential signals to the communication bus.

The example aspect may further include an example non-transient computer-readable medium storing computer executable code for data transmission. The computer executable code may include code for determining whether digital signals received from a first transceiver carry information for a device associated with a microcontroller unit (MCU) based on one or more device IDs included in the digital signals; code for instructing, based on a determination that the digital signals do not carry information for the device associated with the MCU, a configurable logic circuit to transmit the digital signals to a second transceiver connected to a communication bus; code for performing a cyclic redundancy check (CRC) on the digital signals based on a determination that the digital signals carry information for the device associated with the MCU; and code for decoding the digital signals based on a determination that the digital signals pass the CRC.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Several aspects of example communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware or any combination thereof. Whether such elements are implemented as hardware, firmware, or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise memories, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to data transmission over a wired network. An example data transmission system may include a first transceiver and a second transceiver respectively connected to a communication bus. Both of the first transceiver and the second transceiver may be connected to a configurable logic circuit. The configurable logic circuit may be further coupled to or integrated with a microcontroller (MCU). When the first transceiver receives differential signals from the communication bus, the first transceiver may be configured to convert the differential signals to digital signals and transmit the digital signals to the configurable logic circuit. The MCU may be configured to determine whether the digital signals carry information for a device associated with the MCU. If not, the MCU may instruct the configurable logic circuit to transmit the digital signals to the second transceiver. The second transceiver may be configured to convert the digital signals back to differential signals and transmit the differential signals to the communication bus such that the differential signals may travel along the communication bus to a next transceiver.

By implementing the aspects of the current disclosure, the scale of the wired network may be increased, and nodes of the wired network may no longer be limited to 32. The distance between two adjacent nodes may also be increase and the distance of the entire wired network is not limited to 1200 meters. In some examples, the transceivers may be connected in series with the communication bus, thereby reducing the latency of the communication.

Figure 1:
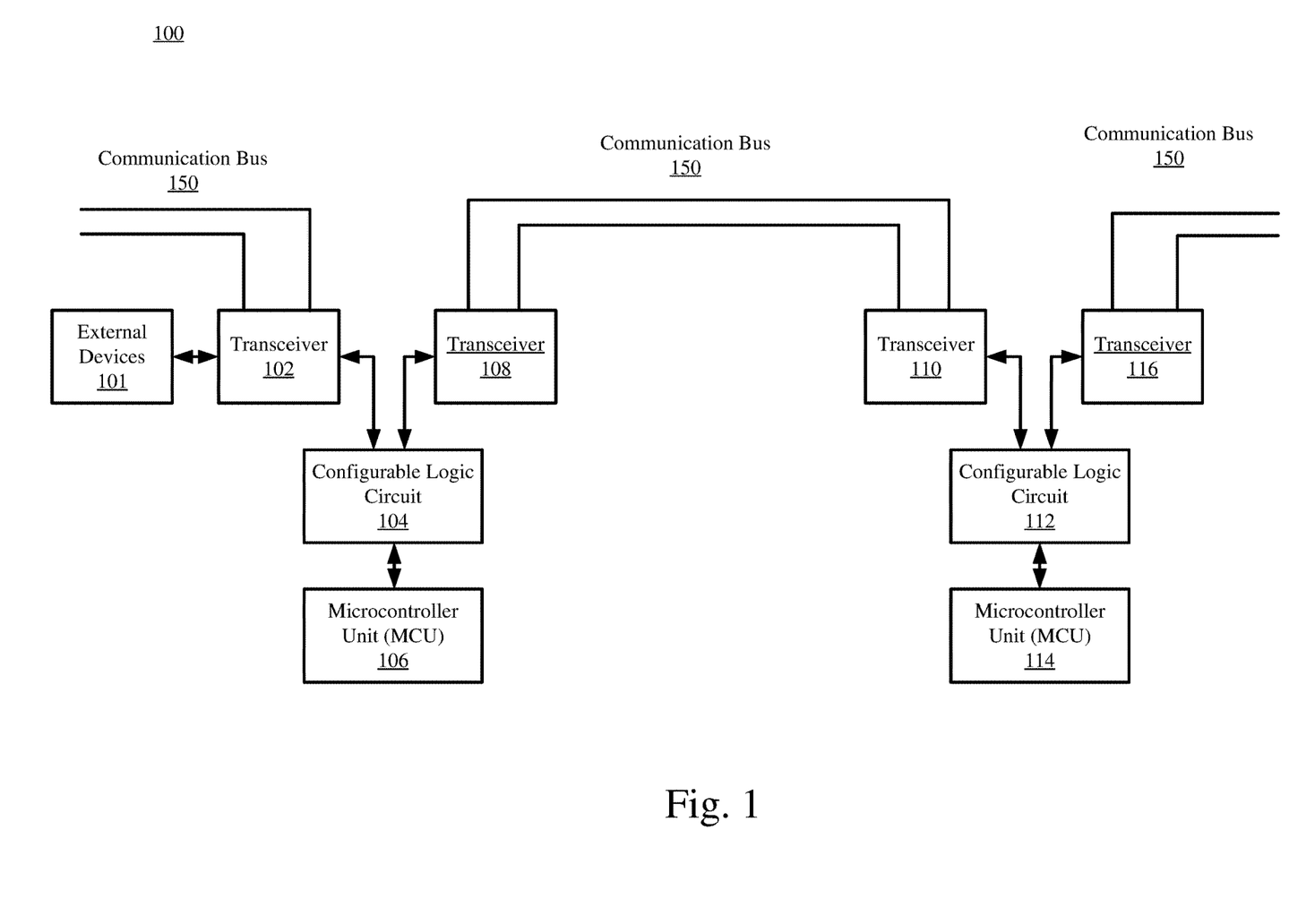
FIG. 1 illustrates a block diagram of an example wired network for data transmission.

FIG. 1 illustrates a block diagram of an example wired network for data transmission. As depicted, a first transceiver 102 and a second transceiver 108 may be connected to a communication bus 150. A configurable logic circuit 104 may be communicatively connected to both the first transceiver 102 and the second transceiver 104. A microcontroller unit (MCU) 106 may be connected to the configurable logic circuit 104. Similarly, a third transceiver 110 and a fourth transceiver 116 may be connected to the communication bus 150. A configurable logic circuit 112 may be connected to both the third transceiver 110 and the fourth transceiver 116. An MCU 114 may be connected to the configurable logic circuit 112.

Figure 2:
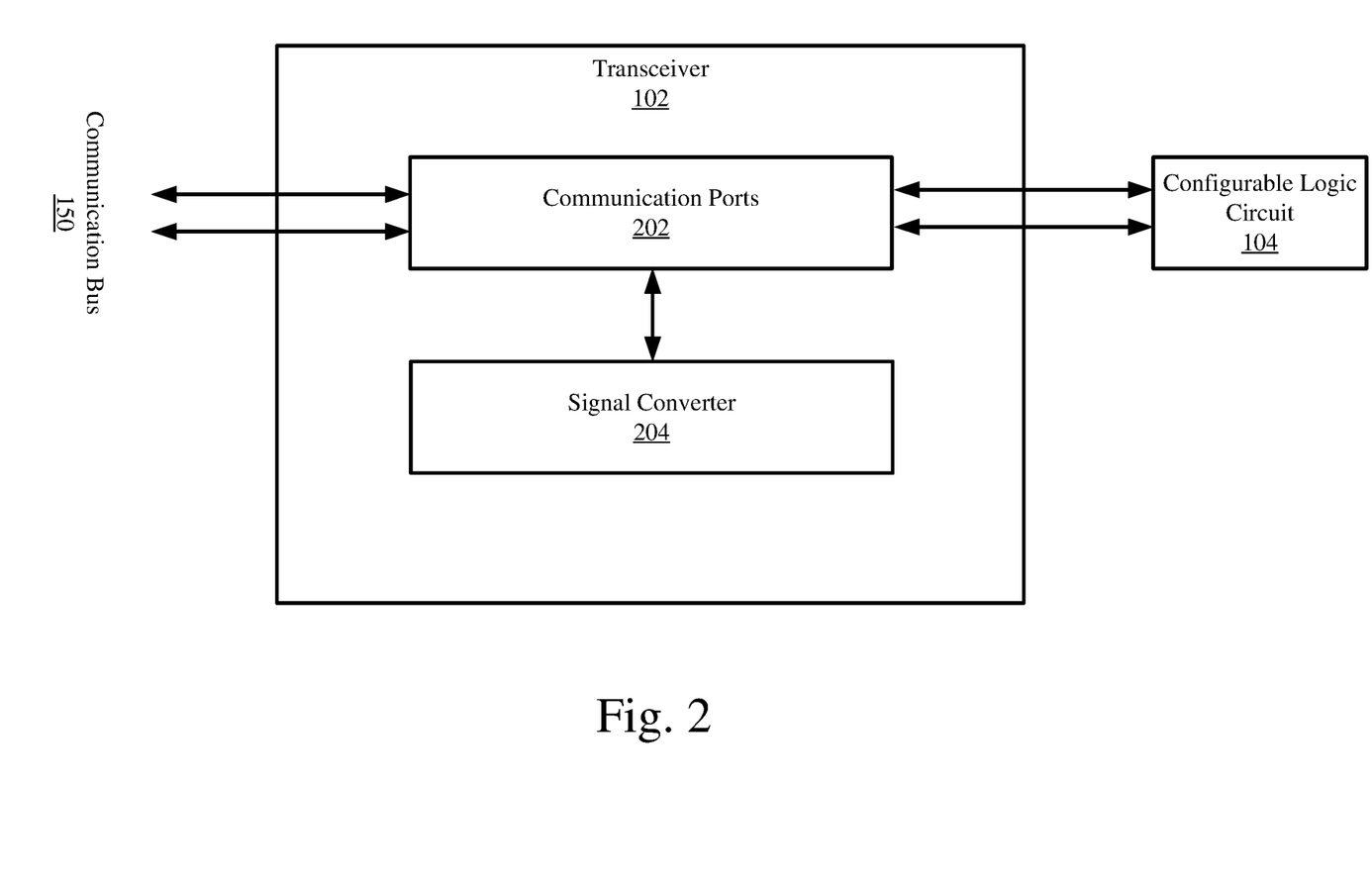
FIG. 2 illustrates an example transceiver implemented in the wired network for data transmission.
Figure 3:
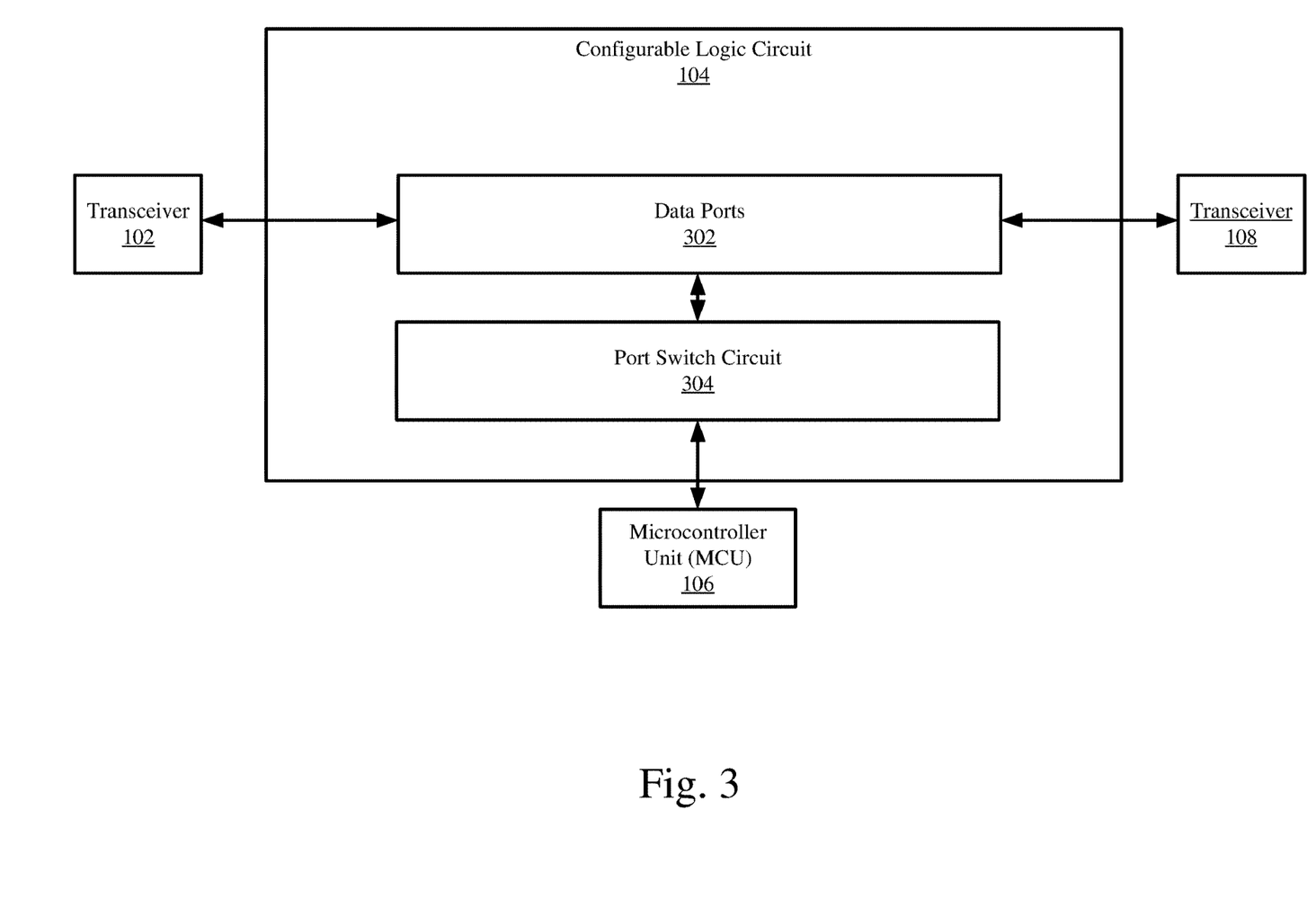
FIG. 3 illustrates an example configurable logic circuit implemented in the wired network for data transmission.

The transceivers 102, 108, 110, and 116 may include similar components in a similar structure as described in further detail in FIG. 2. The configurable logic circuits 104 and 112 may include similar components as depicted in FIG. 3. The MCUs 106 and 114 may be configured to perform similar operations as described in FIG. 4.

Conventionally, differential signals are transmitted over the communication bus 105 but the signal strength of the differential signals may decrease when the differential signals reach the first transceiver 102 and may not be able to travel to the third transceiver 110 at a distance. In accordance with this disclosure, when the first transceiver 102 receives the differential signals, the first transceiver 102 may be configured to convert the differential signals to digital signals and further to transmit the digital signals to the configurable logic circuit 104. The configurable logic circuit 104 may further include a port switch circuit (e.g., port switch circuit 304). In some examples, the port switch circuit may be configured to detect the receipt of the digital signals from the first transceiver 102 and set the second transceiver 108 to a transmission mode. In some other examples, the port switch circuit may be configured to detect the completion of the transmission of the digital signals and set the second transceiver 108 to a reception mode ready for receiving signals from the configurable logic circuit 104.

In some examples, the configurable logic circuit 104 may be configured to directly transmit the digital signals to the second transceiver 108 without communicating with the MCU 106. The second transceiver 108 may be configured convert the digital signals back to differential signals and transmit the differential signals to the communication bus 150.

In some other examples, the configurable logic circuit 104 may further transmit the digital signals to the MCU 106. The MCU 106 may be configured to determine whether the digital signals carry information sent for a device (e.g., an external computer) associated with the MCU 106. For example, the MCU 106 may be configured to extract or identify one or more device identifications (ID) included in the digital signals and determine if one of the device IDs matches a device ID of the associated device. If at least one of the extracted or identified device IDs matches the device ID of the associated device, the MCU 106 may determine that the digital signals carry information for the associated device.

Based on a determination that the digital signals carry the information for the associated device, the MCU 106 may be configured to further perform a cyclic redundancy check (CRC) on the digital signals to determine if errors exist in data carried by the digital signals. If the digital signals pass the CRC, the MCU 106 may be configured to further decode the digital signals to extract the information for the associated device.

In some other examples, the MCU 106 may be configured to determine that the digital signals do not carry information for the associated device, e.g., the extracted devices ID do not match the device ID of the associated device. The MCU 106 may be configured to continue the transmission of the digital signals.

In some examples, the first transceiver 102 may be configured to continuously or periodically monitor the communication bus 150 to generate a monitoring result to indicate whether the communication bus 150 is busy. If the monitoring result indicates that the communication bus 150 is busy, the MCU 106 may be configured to instruct the first transceiver 102 to continue monitoring the communication bus 150 and generate another monitoring result after a predetermined period. The MCU 106 may also temporarily store the digital signals. If the monitoring result indicates that the communication bus 150 is idle, the MCU 106 may be configured to instruct a port switch circuit of the configurable logic circuit 104 to transmit the digital signals to the second transceiver 108. The second transceiver 108 may be configured to convert the digital signals back to differential signals and transmit the differential signals to the communication bus 150. Since the differential signals are regenerated or restored by the second transceiver 108 from the digital signals, the signal strength of the differential signals may also be restored and thus may travel farther to reach the third transceiver 110.

In some other examples, original differential signals may be transmitted from the fourth transceiver 116 to the first transceiver 102.

FIG. 2 illustrates an example transceiver 102 implemented in the wired network for data transmission. As stated above, other transceivers 108, 110, and 116 may include similar components in a similar structure. As depicted in FIG. 2, the first transceiver 102 may include one or more communication ports 202. The communication ports 202 may be connected to the communication bus 150 to receive differential signals from the communication bus 150 or to transmit differential signals to the communication bus 150. The communication ports 202 may be further connected to the configurable logic circuit 104.

Further, the first transceiver 102 may include a signal converter 204 configured to convert the differential signals received from the communication bus 150 to digital signals. The digital signals may be transmitted to the configurable logic circuit 104 via the communication ports 202. In some other examples, the signal converter 204 may be configured to convert digital signals received from the configurable logic circuit 104 to differential signals. The differential signals may be transmitted to the communication bus 150 via the communication ports 202.

FIG. 3 illustrates an example configurable logic circuit 104 implemented in the wired network for data transmission. As stated above, other configurable logic circuits, e.g., the configurable logic circuit 112, may include similar components in a similar structure. As depicted, the configurable logic circuit 104 may include one or more data ports 302 connected to the first transceiver 102 and the second transceiver 108. The configurable logic circuit 104 may further include a port switch circuit 304 connected to the data ports 302. The port switch circuit 304 may be configured to control the connection of the data ports. For example, the port switch circuit 304 may be configured to determine to which transceiver the digital signals may be transmitted. The port switch circuit 304 may be further connected to and/or controlled by the MCU 106.

In some examples, the first transceiver 102 may be configured to transmit the converted digital signals the configurable logic circuit 104 via the data ports 302. The configurable logic circuit 104 may be configured to transmit the digital signals to the second transceiver 108 via the data ports 302.

Figure 4:
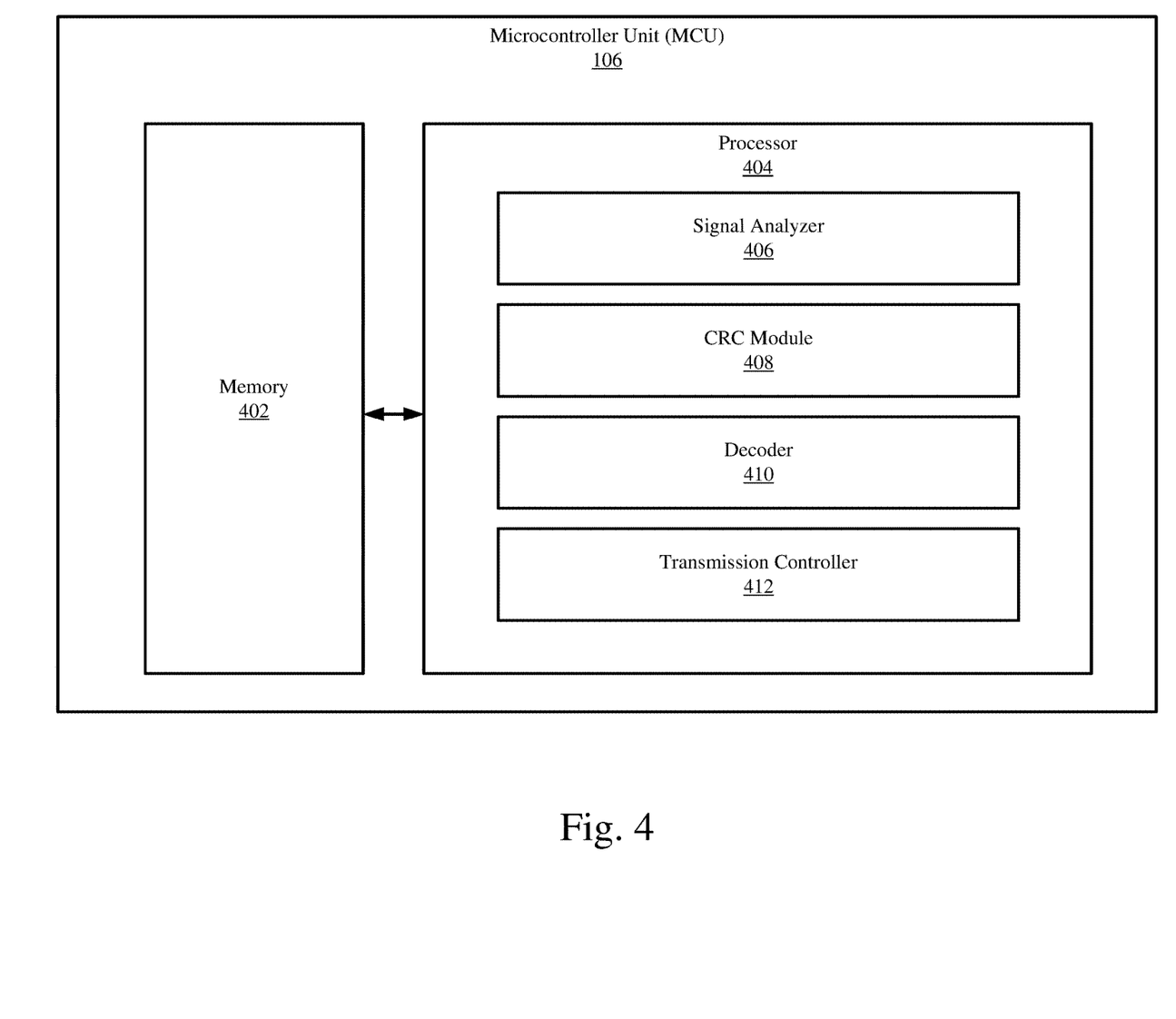
FIG. 4 illustrates an example microcontroller unit (MCU) implemented in the wired network for data transmission.

FIG. 4 illustrates an example microcontroller unit (MCU) 106 implemented in the wired network for data transmission. As depicted, the MCU 106 may include a memory 402 configured to store the digital signals, monitoring results, CRC algorithms, instructions, and other data/information related to the operations performed by the MCU 106.

The MCU 106 may include a processor 404 that includes multiple components respectively configured to perform multiple operations. The term "component" or "module" as used herein may be one of the parts that make up a system, may be hardware, firmware, software, or any combination thereof, and may be divided into other components or modules.

In some examples, the processor 404 may include a signal analyzer 406. The signal analyzer 406 may be configured to determine whether the digital signals received from the first transceiver 102 carry the information for a device associated with the MCU 106. For example, the signal analyzer 406 may be configured to determine may be configured to extract or identify one or more device identifications (ID) included in the digital signals and determine if one of the device IDs matches a device ID of the associated device. If at least one of the extracted or identified device IDs matches the device ID of the associated device, the signal analyzer 406 may determine that the digital signals carry information for the associated device.

In some examples, the processor 404 may include a cyclic redundancy check (CRC) module 408 configured to perform a CRC on the digital signals based on a determination that the digital signals carry information for the device associated with the MCU 106 to determine if errors exist in data carried by the digital signals. If the digital signals pass the CRC, a decoder 410 of the MCU 106 may be configured to further decode the digital signals to extract the information for the associated device.

The processor 404 may further include a transmission controller 412. In some examples, the first transceiver 102 may be configured to continuously or periodically monitor the communication bus 150 to generate a monitoring result to indicate whether the communication bus 150 is busy. If the monitoring result indicates that the communication bus 150 is busy, the transmission controller 412 may be configured to instruct the first transceiver 102 to continue monitoring the communication bus 150 and generate another monitoring result after a predetermined period. The digital signals may be temporarily stored in the memory 402. If the monitoring result indicates that the communication bus 150 is idle, the transmission controller 412 may be configured to instruct the port switch circuit 304 to transmit the digital signals to the second transceiver 108 via the data ports. The second transceiver 108 may be configured to convert the digital signals back to differential signals and transmit the differential signals to the communication bus 150.

Figure 5:
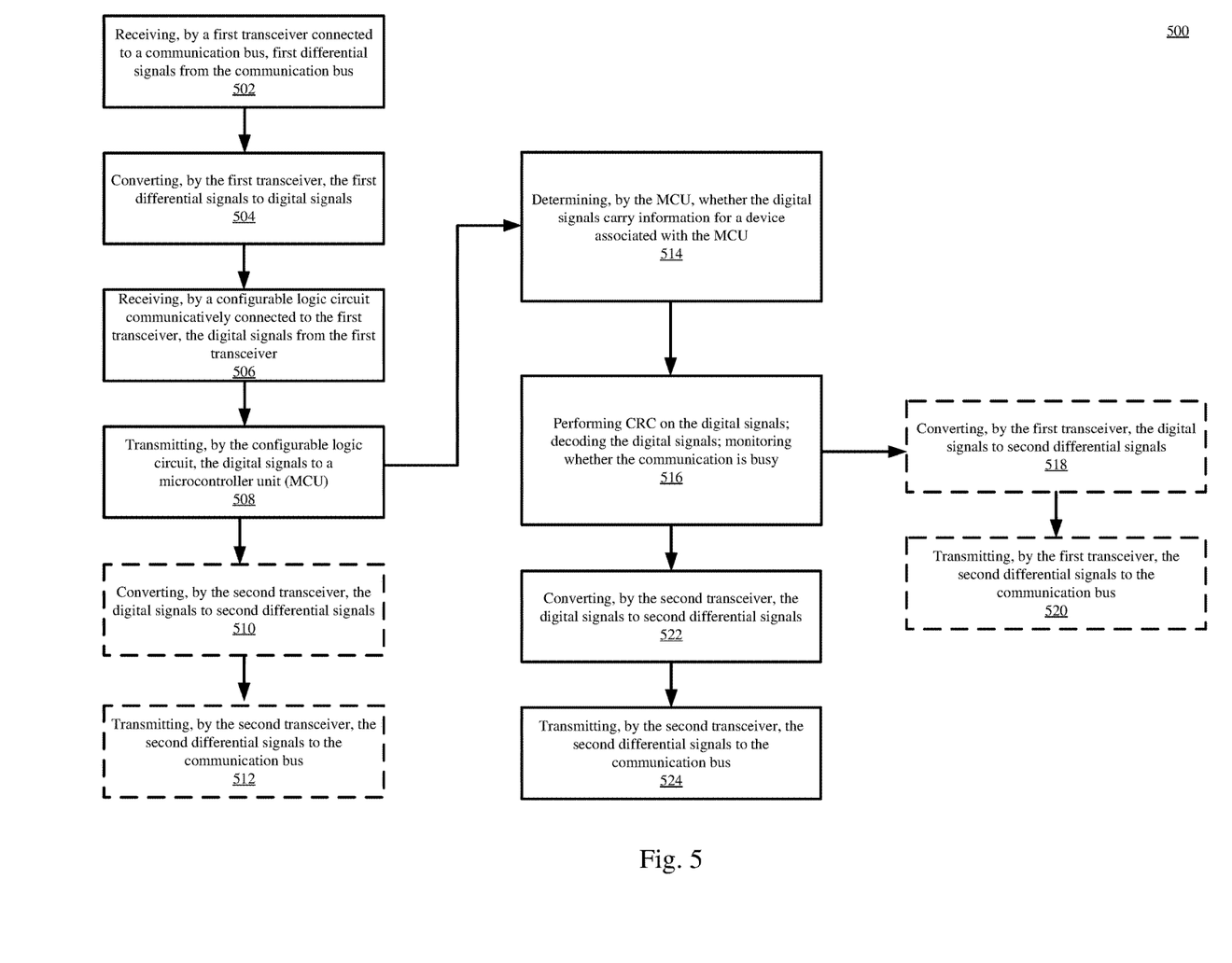
FIG. 5 illustrates a flow chart of an example method for data transmission in a wired network.

FIG. 5 illustrates a flow chart of an example method 500 for data transmission in a wired network. The example method 500 may be performed by one or more components described in accordance with FIGS. 1-4. Dash-lined blocks may indicate optional operations.

At block 502, the example method 500 may include receiving, by a first transceiver connected to a communication bus, first differential signals from the communication bus. For example, the first transceiver 102 may be connected to the communication bus 150 and may be configured to receive differential signals from the communication bus 150.

At block 504, the example method 500 may include converting, by the first transceiver, the first differential signals to digital signals. For example, when the first transceiver 102 receives the differential signals, the signal converter 204 of the first transceiver 102 may be configured to convert the differential signals to digital signals and further to transmit the digital signals to the configurable logic circuit 104.

At block 506, the example method 500 may include receiving, by a configurable logic circuit communicatively connected to the first transceiver, the digital signals from the first transceiver. For example, the configurable logic circuit 104 may be communicatively connected to the first transceiver 102 and configured to receive the digital signals via the data ports 302 from the first transceiver 102.

At block 508, the example method 500 may include transmitting, by the configurable logic circuit, the digital signals to a microcontroller unit (MCU). For example, the configurable logic circuit 104 may transmit the digital signals to the MCU 106.

At block 510, the example method 500 may optionally include converting, by the second transceiver, the digital signals to the second differential signals. For example, the second transceiver 108 may be configured to convert the digital signals back to differential signals.

At block 512, the example method 500 may optionally include transmitting, by the second transceiver, the second differential signals to the communication bus. For example, the second transceiver 108 may be configured to transmit the differential signals to the communication bus 150.

At block 514, the example method 500 may include determining, by the MCU, whether the digital signals carry information for a device associated with the MCU. For example, the signal analyzer 406 of the MCU 106 may be configured to determine whether the digital signals received from the first transceiver 102 carry the information for a device associated with the MCU 106. For example, the signal analyzer 406 may be configured to determine may be configured to extract or identify one or more device identifications (ID) included in the digital signals and determine if one of the device IDs matches a device ID of the associated device. If at least one of the extracted or identified device IDs matches the device ID of the associated device, the signal analyzer 406 may determine that the digital signals carry information for the associated device.

At block 516, the example method 500 may include performing a cyclic redundancy check (CRC) on the digital signals to determine if errors exist in data carried by the digital signals; decoding the digital signals; and monitoring whether the communication bus is busy. For example, the MCU 106 may be configured to further perform a cyclic redundancy check (CRC) on the digital signals to determine if errors exist in data carried by the digital signals. If the digital signals pass the CRC, the MCU 106 may be configured to further decode the digital signals to extract the information for the associated device. Further to the example, if a monitoring result from the first transceiver 102 indicates that the communication bus 150 is idle, the transmission controller 412 may be configured to instruct the port switch circuit 304 of the configurable logic circuit 104 to transmit the digital signals to the second transceiver 108 via the data ports 302 or the first transceiver 102.

At block 518, the example method 500 may optionally include converting, by the first transceiver, the digital signals to the second differential signals. For example, the first transceiver 102 may be configured to convert the digital signals back to differential signals.

At block 520, the example method 500 may optionally include transmitting, by the first transceiver, the second differential signals to the communication bus. For example, the first transceiver 102 may be configured to transmit the differential signals to the communication bus 150.

At block 522, the example method 500 may include converting, by the second transceiver, the digital signals to second differential signals. For example, the second transceiver 108 may be configured to convert the digital signals back to differential signals At block 524, the example method 500 may include transmitting, by the second transceiver, the second differential signals to the communication bus. For example, the second transceiver 108 may be configured to transmit the differential signals to the communication bus 150.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

I claim:

1. A data transmission system, comprising:
    a first transceiver connected to a communication bus and configured to:
    receive first differential signals from the communication bus, and
    convert the first differential signals to digital signals;
        a configurable logic circuit communicatively connected to the first transceiver and configured to:
        receive the digital signals from the first transceiver, and
        transmit the digital signals to a microcontroller unit (MCU), wherein the MCU is configured to:
        determine whether the digital signals carry information for a device associated with the MCU, and
        instruct, based on a determination that the digital signals do not carry information for the device associated with the MCU, the configurable logic circuit to transmit the digital signals to a second transceiver connected to the communication bus, wherein the second transceiver is configured to convert the digital signals to second differential signals and transmit the second differential signals to the communication bus.

2. The data transmission system of claim 1, wherein the MCU is configured to determine whether the digital signals carry information for a device associated with the MCU based on one or more device IDs included in the digital signals.

3. The data transmission system of claim 1, wherein the MCU is configured to perform a cyclic redundancy check (CRC) on the digital signals based on a determination that the digital signals carry information for the device associated with the MCU.

4. The data transmission system of claim 3, wherein the MCU is configured to decode the digital signals based on a determination that the digital signals pass the CRC.

5. The data transmission system of claim 1, wherein the first transceiver is configured to monitor the communication bus to generate a monitoring result.

6. The data transmission system of claim 5, wherein the MCU is configured to determine whether the communication bus is busy based on the monitoring result.

7. The data transmission system of claim 6, wherein the MCU is configured to instruct a port switch circuit of the configurable logic circuit to transmit the digital signals to the second transceiver based on a determination that the communication bus is not busy.

8. The data transmission system of claim 6, wherein the MCU is configured to instruct the first transceiver to continue to monitor the communication bus based on a determination that the communication bus is busy.

9. A method for data transmission over wired networks, comprising:
    receiving, by a first transceiver connected to a communication bus, first differential signals from the communication bus;
    converting, by the first transceiver, the first differential signals to digital signals;
    receiving, by a configurable logic circuit communicatively connected to the first transceiver, the digital signals from the first transceiver;
    transmitting, by the configurable logic circuit, the digital signals to a microcontroller unit (MCU);
    determining, by the MCU, whether the digital signals carry information for a device associated with the MCU;
    instructing, by the MCU based on a determination that the digital signals do not carry information for the device associated with the MCU, the configurable logic circuit to transmit the digital signals to a second transceiver connected to the communication bus;
    converting, by the second transceiver, the digital signals to second differential signals; and
    transmitting, by the second transceiver, the second differential signals to the communication bus.

10. The method of claim 9, further comprising determining, by the MCU, whether the digital signals carry the information for a device associated with the MCU based on one or more device IDs included in the digital signals.

11. The method of claim 9, further comprising performing, by the MCU, a cyclic redundancy check (CRC) on the digital signals based on a determination that the digital signals carry information for the device associated with the MCU.

12. The method of claim 11, further comprising decoding, by the MCU, the digital signals based on a determination that the digital signals pass the CRC.

13. The method of claim 9, further comprising monitoring, by the first transceiver, the communication bus to generate a monitoring result.

14. The method of claim 13, further comprising determining, by the MCU, whether the communication bus is busy based on the monitoring result.

15. The method of claim 14, further comprising instructing, by the MCU, a port switch circuit of the configurable logic circuit to transmit the digital signals to the second transceiver based on a determination that the communication bus is not busy.

16. The method of claim 14, further comprising instructing, by the MCU, the first transceiver to continue to monitor the communication bus based on a determination that the communication bus is busy.

* * * * *